United States Patent
Hoheisel et al.

(10) Patent No.: US 6,847,701 B2
(45) Date of Patent: Jan. 25, 2005

(54) X-RAY DETECTOR WITH AN APPLIED STRAY RADIATION GRID, AND METHOD FOR APPLYING A STRAY RADIATION GRID TO AN X-RAY DETECTOR

(75) Inventors: Martin Hoheisel, Briangen (DE); Hartmut Skleritz, Erlangen (DE)

(73) Assignee: Siemens Aktiengesellschaft, Münich (DE)

( * ) Notice: Subject to any disclaimer, the term of this patent is extended or adjusted under 35 U.S.C. 154(b) by 148 days.

(21) Appl. No.: 10/277,071

(22) Filed: Oct. 21, 2002

(65) Prior Publication Data

US 2003/0089857 A1 May 15, 2003

(30) Foreign Application Priority Data

Oct. 23, 2001 (DE) .......................... 101 51 568

(51) Int. Cl.[7] .................................. G21K 1/00
(52) U.S. Cl. .......................... 378/154; 378/145; 430/4
(58) Field of Search ................. 378/145, 147, 378/149, 154, 204; 250/505.1; 264/400, 401, 482; 425/174, 174.4; 430/4, 321, 322

(56) References Cited

U.S. PATENT DOCUMENTS

| | | | |
|---|---|---|---|
| 6,021,173 A | 2/2000 | Brauers et al. | ............ 378/98.8 |
| 6,778,632 B2 * | 8/2004 | Hoheisel et al. | ........... 378/98.8 |

* cited by examiner

Primary Examiner—Edward J. Glick
Assistant Examiner—Courtney Thomas
(74) Attorney, Agent, or Firm—Schiff Hardin LLP

(57) ABSTRACT

In an X-ray detector and method for applying a stray radiation grid onto an X-ray detector having detector elements arranged in a matrix that form a detector surface having detection regions sensitive to X-rays and less sensitive intermediate regions, a basic structure for the stray radiation grid is built up over the detector surface directly on the X-ray detector with a rapid prototyping technique and is subsequently coated or filled with a material that is highly absorbent for X-radiation. An absorbent structure thus arises that lies over the less sensitive intermediate regions of the detector surface. Moiré disturbances are avoided in the X-ray image exposure and the detective quantum efficiency (DQE) is increased.

14 Claims, 4 Drawing Sheets

X-RAY DETECTOR WITH AN APPLIED STRAY RADIATION GRID, AND METHOD FOR APPLYING A STRAY RADIATION GRID TO AN X-RAY DETECTOR

BACKGROUND OF THE INVENTION

1. Field of the Invention

The present invention is directed to a method for applying a stray radiation grid having detector elements arranged in a matrix, and is also directed to an X-ray detector having a stray radiation grid that applied by such a method.

2. Description of the Prior Art

In X-ray image technology, high demands are currently made of the image quality of the X-ray exposures. For making such exposures, particularly as implemented in medical X-ray diagnostics, a subject to be examined is transirradiated by X-rays of an approximately punctiform X-ray source, and the attenuation distribution of the X-rays is two-dimensionally acquired at that side of the subject opposite the X-ray source. A line-by-line acquisition of the X-rays attenuated by the subject also can be undertaken, for example in computed tomography installations. In addition to X-ray films and gas detectors, solid-state detectors are being increasingly utilized, these usually having a matrix-like arrangement of optoelectronic semiconductor components as optoelectrical receivers. Ideally, each picture element of the X-ray exposure should correspond to the attenuation of the X-rays by the subject on a straight-line axis from the punctiform X-ray source to a location at the detector surface corresponding to the picture element. X-rays that are incident on the X-ray detector that proceed on such a straight-line axis from the punctiform X-ray source are referred to as primary rays.

Due to unavoidable interactions, however, the X-rays emanating from the X-ray source are scattered in the subject, so that scattered rays, referred to as secondary rays, are also incident onto the detector in addition to the primary rays. These scattered rays, which can cause up to more than 90% of the overall signal modulation of an X-ray detector in diagnostic images dependent on properties of the subject, represent an additional noise source and therefore diminish the recognizability of fine contrast differences. This serious disadvantage of the stray radiation is due to a significant, additional noise component in the image exposure caused by the quantum property of the stray radiation.

For reducing the stray radiation incident on the detector, a stray radiation grid is introduced between the subject and the detector. Stray radiation grids are composed of regularly arranged structures that absorb X-rays and between which through channels or through slots are fashioned for the optimally unattenuated passage of the primary radiation. Given focused stray radiation grids, these through channels or through slots are directed toward the focus in conformity with the distance from the punctiform X-ray source, i.e. the distance from the focus of the X-ray tube. In unfocussed stray radiation grids, the through channels or through slots are arranged over the entire surface of the stray radiation grid perpendicular to the surface thereof. This, however, leads to a noticeable loss of primary radiation at the edges of the image exposure since a larger part of the incident primary radiation strikes the absorbent regions of the stray radiation grid at these locations.

Extremely high demands are made on the properties of X-ray stray radiation grids for achieving a high image quality. The scattered rays should be absorbed as well as possible; however, as much of the primary radiation as possible should pass through the stray radiation grid unattenuated. A reduction of the scattered rays incident on the detector surface can be achieved by a large ratio of the height of the stray radiation grid to the thickness or the diameter of the through channels or through slots, i.e. by a high shaft ratio. However, image disturbances due to absorption of a part of the primary radiation can occur because of the thickness of the absorbent structure or wall elements lying between the through channels or through slots. Especially given employment of solid-state detectors, inhomogeneities of the grid, i.e. deviations of the absorbent regions from their ideal position, lead to image disturbance due to an imaging of the grid in the X-ray image.

For minimizing image disturbances due to stray radiation grids, it is known to move the grids in the lateral direction during the exposure. Given extremely short exposure times of, for example, 1–3 ms, however, stripes still can occur in the image due to an inadequate motion velocity of the grids. Disturbing stripes due to the reversal of the motion direction of the grids during the exposure also can occur given very long exposure times.

Solid-state detectors that are formed of a number of detector elements arranged in a matrix are being recently increasingly utilized for X-ray image exposures. The detector elements are arranged in a grid that is usually quadratic or rectangular. The incidence of scattered rays onto the detector surface formed by the detector elements also must be reduced as far as possible in such solid-state detector by means of effective suppression measures. Due to the regular structure of the picture elements of the detector formed by the detector elements, there is the additional risk that the structures of picture elements and stray radiation grids interfere with one another. Disturbing Moiré phenomena can occur as a result. These can be minimized or eliminated by a subsequent image processing measure in certain instances. This, however, is possible only when their projection image on the detector is absolutely invariable.

U.S. Pat No. 6,021,173 discloses an approach that is intended to avoid Moiré structures during operation of an X-ray detector with detector elements arranged in a matrix in conjunction with a stationarily arranged stray radiation grid. In this patent, the stray radiation grid is applied over the detector surface directly on the X-ray detector. The absorbent structural elements of the stray radiation grid are disposed at a distance from one another that is less than the expanse of the smallest resolvable detail in the X-ray image. The regularly arranged, absorbent structure elements therefore are imaged with such a high spatial frequency that they lie beyond the resolution of the X-ray detector. Since the spacing of the structural elements in the stray radiation grid cannot be selected arbitrarily small, a detector having an adapted, limited spatial resolution must be employed. This, however, leads to an undesirable reduction of the detective quantum efficiency (DQE) given high spatial frequencies.

SUMMARY OF THE INVENTION

An object of the present invention is to provide an X-ray detector and a method for the application of a stray radiation grid onto an X-ray detector wherein detector elements are arranged in a matrix, which enable an image exposure without Moiré structures with a high detective quantum efficiency.

The above object is achieved in accordance with the principles of the present invention in an X-ray detector having a stray radiation grid applied thereto, and in a method for applying a stray radiation grid to an X-ray detector, wherein the X-ray detector has detector elements arrangements in a matrix which form a detector surface having detection regions that are sensitive to X-rays and intermediate regions that are less sensitive to X-rays, wherein a basic structure for the stray radiation grid is built up over the detector surface directly on the X-ray detector with a rapid prototyping technique, and is subsequently coated or filled with a material that is highly absorbent for X-rays, so that an absorbent structure is produced that lies over the less sensitive intermediate regions of the detector surface.

In the inventive method, the stray radiation grid is applied directly onto the X-ray detector having detector elements arranged in a matrix that form a detector surface with detection regions sensitive to X-radiation and intermediate regions that are less sensitive or insensitive. The application of the stray radiation grid ensues by building up a basic structure for the stray radiation grid over the detector surface or area of the X-ray detector by means of a rapid prototyping technique, particularly with the technique of stereo lithography, and subsequent coating or filling of the basic structure with a material that is highly absorbent for X-radiation. The basic structure is thereby applied over the detector surface such that an X-ray-absorbent structure that lies over the intermediate regions of the detector surface arises. These intermediate regions of the detector surface that are less sensitive or insensitive to X-radiation correspond to the regions in which the individual detector elements abut one another. Since the detector elements are usually not light sensitive over their entire area insensitive intermediate regions arise in the edge regions of the individual detector elements.

The basic structure for the stray radiation grid preferably is constructed in the inventive method such that the absorbent structure elements extend only over the intermediate regions on the detector. If the structure elements cannot be generated with an adequately slight thickness due to especially narrow intermediate regions, then they at least lie symmetrically over the intermediate elements in the contact region with the detector surface. It is self-evident that the absorbent structure elements deviate from this symmetry with increasing height of the stray radiation grid when a focused stray radiation grid is applied onto the detector.

Due to the employment of a rapid prototyping technique for building up the basic structure, extremely thin structures can be generated with very high precision. In the rapid prototyping technique, 3D CAD designs—the geometry of the basic structure in this case—are converted into volume data in the CAD system. The 3D volume model for the rapid prototyping is subsequently divided into cross-section in a computer. The cross-sections have a layer thickness of 100 $\mu$m or less. The original form is built up layer by layer after the transfer of the data onto a rapid prototyping system. The inventive method utilizes a rapid prototyping technique wherein the layer build-up ensues due to the action of radiation, particularly laser radiation. It is thus the laser radiation that offers the advantage of generating extremely thin structures.

In a preferred embodiment of the present method, the technique of stereo lithography is utilized for building up the basic structure. In this method, a computer-controlled UV laser beam forms the respective contours of the individual layers of the 3D volume model of the basic structure on a fluid polymer resin. The resin hardens at the exposed locations or surfaces due to the action of the laser. The construction platform of the system is then lowered and a new, thin layer of photopolymer resin is applied. The complete geometry of the basic structure is successively built up from bottom to top be repeating these steps. In the present case, the X-ray detector itself is attached on the construction platform and is lowered together with the construction platform during the layer-by-layer build-up of the basic structure. It is self-evident that the X-ray detector must be protected from the fluid polymer in a suitable way. In an embodiment of the present method, the technique of micro-stereolithography is utilized for generating the basic structure. This technique enables a faster build-up of the basic structure with high precision.

In the inventive method, the basic structure can be applied onto the X-ray detector such that the geometry of the basic structure corresponds to the geometry of the later-applied, absorbent structure elements that has been reduced by a certain layer thickness. Subsequently, this basic structure is merely coated with a material that has a high atomic number and is highly absorbent for X-radiation, for example lead, in order to obtain the absorbent structure elements of the stray radiation grid.

In another embodiment, the basic structure is applied onto the X-ray detector as negative form for the stray radiation grid, with the regions provided for the absorbent structure elements remaining free. Subsequently, these remaining interspaces of the basic structure are filled with a highly absorbent material. This filling can ensue with different techniques.

In one embodiment, the interspaces are filled by a galvanic process wherein an electroplating start layer is applied, for example by sputtering, onto the basic structure, including the sidewalls in the interspaces and the exposed surface regions of the X-ray detector. This electrically conductive start layer is connected to one pole of a current source. Subsequently, the entire arrangement is immersed into an electrolytic fluid until the interspaces are filled by deposition of the absorbent material. An optimally uniform circulation of the electrolytic fluid should be assured during the coating. Further, the detector structures must be protected in a suitable way from the influence of the electrolyte and from the temperatures occurring in the electrolysis.

In another embodiment of the inventive method, the filling ensues by casting the interspaces out with a material that has a low melting point and is highly absorbent for X-radiation. A material must be selected that causes no damage to the detector either during casting or due to later diffusion. It must be assured for detectors that are based on amorphous selenium that the temperatures of the selenium do not exceed 40–50° C. during the casting, so that no crystallization occurs. This can be achieved by thermally insulating intermediate layers between the surface of the detector and the basic structure and/or by additional cooling of the detector. Further, it can be advantageous to employ reduced air pressure or vacuum during the filling in order to reduce or avoid air inclusions when filling. Eutectics alloys or elements that contain at least one of the elements lead, tin, bismuth, cadmium, indium, mercury or gallium are suited as preferred materials for the filling the interspaces.

It is also possible to fill the interspaces mechanically, for example by smoothing, pressing, casting or pressure-oriented methods. This ensues with a material that contains elements with a high atomic number that are introduced into the interspaces mixed with or dissolved in a liquid adhesive. It also can be advantageous to maintain a reduced air pressure or a vacuum during the filling in order to reduce or avoid air inclusions.

Interferences with the pixel structure are precluded due to the application of preferably cell-like X-ray-absorbent structure only or mainly in the interspaces between the individual detector regions. X-ray detectors almost always have a filling factor that is less than 1. This is particularly true of a-Si detector surfaces coated with a luminophore. The filling factor also differs from 1 given detector surfaces coated with selenium, particularly given small detection regions or pixels. As a result, the quantum efficiency is reduced mainly in the regions between the pixel surfaces. When the primary radiation is attenuated only between the pixels by the structures that absorb scattered rays, this is more advantageous for achieving a high quantum efficiency than if these structures were arbitrarily arranged. Moiré disturbances between the pixels and the absorbent structure thus are not possible. This is achieved with the present method without having to provide a specific converter layer with low-pass behavior. Fine details therefore can be recognized better, and the detective quantum efficiency given high spatial frequencies is far better than with an arrangement according to U.S. Pat. No. 6,021,173. Due to the present method for the direct application of the stray radiation grid on the detector, raster imagings are precluded even given the shortest exposure times. The need for a raster mechanism and control for moving the grid is eliminated. Due to the elimination of a conventional stray radiation grid at a distance from the detector, a reduced geometrical enlargement also derives, as does an enlarged subject format given the same detector size.

The inventive arrangement of the stray radiation grid enables a better exploitation of the primary radiation since the unavoidable primary absorption of the stray radiation grid falls into geometrical regions of the detector that make a reduced contribution to the image signal.

In a preferred embodiment of the present method, the geometry of the basic structure is selected to exactly correspond to the matrix arrangement of the detector elements, so that a cell-like stray radiation grid arises wherein the arrangement of regions transmissive for X-radiation coincides with the arrangement of the detection regions. Of course other arrangements are possible wherein the absorbent structure elements proceed only in a direction parallel to the rows or columns of the detector matrix or have a step-shaped course.

The surface of the detector preferably is coated with an intermediate layer before the application of the basic structure in order to improve the adhesion of the applied basic structure. The intermediate layer also can serve for improving the planarity of the substrate as well as for reducing the thermal conductivity to the detector elements. The reduction of the thermal conductivity protects the detector against excessive temperatures, particularly during the filling of the absorption channels.

Of course, arbitrary detector types are possible as the X-ray detector onto which the stray radiation grid can be applied with the present method. For example, detectors with a photoconductive material or detectors having an applied scintillator layers can thus be utilized.

DESCRIPTION OF THE PREFERRED EMBODIMENTS

Figure 1:
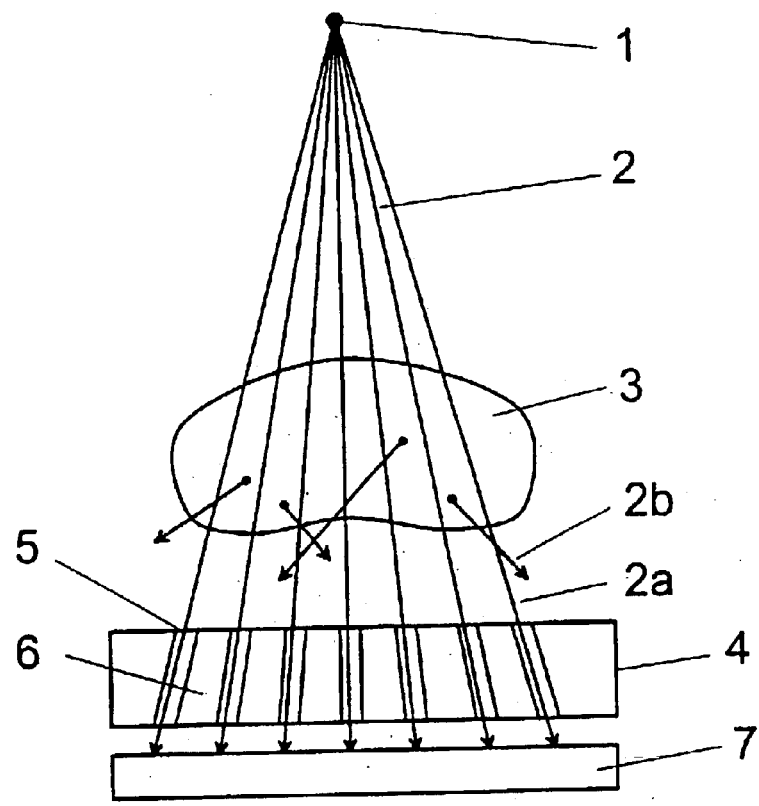
FIG. 1 is a schematic illustration of the relationships in an X-ray image exposure of a subject using a stray radiation grid.

The typical relationships in an X-ray image exposure of a subject 3 in X-ray diagnostics are schematically shown on the basis of FIG. 1. The subject 3 is situated between the tube focus 1 of an X-ray tube, which can be considered as an approximately punctiform X-ray source, and a detector surface 7. The X-rays 2 emanating from the focus 1 of the X-ray source propagate on a straight line in the direction of the X-ray detector 7 and thereby penetrate the subject 3. The primary rays 2a that penetrate the subject 3 on a straight line proceeding from the focus 1 and which strike the detector surface 7 produce a topically resolved attenuation value distribution for the subject 3 on the detector surface 7. Some of the X-rays 2 emanating from the X-ray focus are scattered in the subject 3. The scattered rays 2b that thereby arise do not contribute to the desired image information and considerably degrade the signal-to-noise ration when they strike the detector 7. A stray radiation grid 4 therefore is arranged in front of the detector 7 for improving the image quality. This stray radiation grid 4 has through channels 5 and absorbent regions 6. The through channels 5 are aligned in the direction of the tube focus 1 so that they allow the incident primary radiation 2a to strike the detector surface on a straight-line path. Rays that are not incident in this direction, particularly the scattered rays 2b, are blocked or considerably attenuated by the absorbent regions 6. Due to the known manufacturing techniques, however, the absorbent regions can only be realized with a certain minimum thickness, so that a considerable part of the primary radiation 2a is still absorbed and does not contribute to the image.

Figure 2:
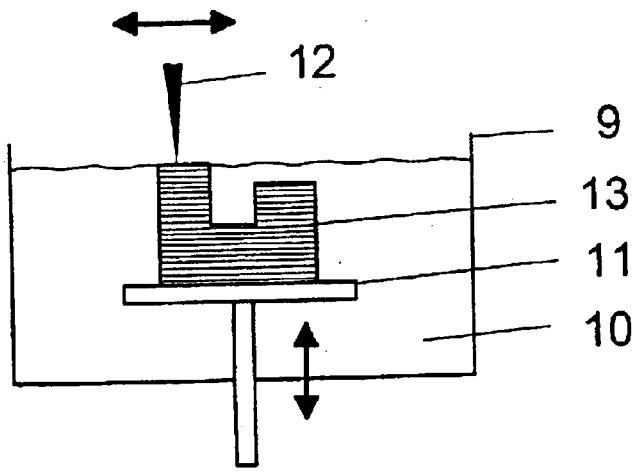
FIG. 2 illustrates the technique of stereolithography.

The present invention offers a method that enables a very precise fabrication of stray radiation grids with very thin absorbent structures or partitions 6 between the through channels 5 directly on the X-ray detector. A rapid prototyping technique is thereby utilized for the manufacture of the stray radiation grid. An example of such a technique is stereolithography, as illustrated on the basis of FIG. 2. In this technique, a UV laser beam 12 is directed onto the surface of a fluid UV-crosslinkable polymer 10 that is situated in a container 9. In order to build up the basic structure 13 in layers, the UV laser beam 12 moves across the surface of the fluid polymer 10 on the basis of a three-dimensional volume model of the basic structure 13 to be produced. After the solidification of a layer, this is lowered by a further layer thickness by a construction platform 11, so that the UV laser 12 can solidify the next layer in conformity with the three-dimensional volume model. In this way, the basic structure 13 of the crosslinked, UV-hardened polymer 10 is built up layer-by-layer in the X-ray detector (not shown in FIG. 2). Very thin structures can thereby be realized with very high precision due to the good focusing ability of the UV laser beam 12.

Figure 3:
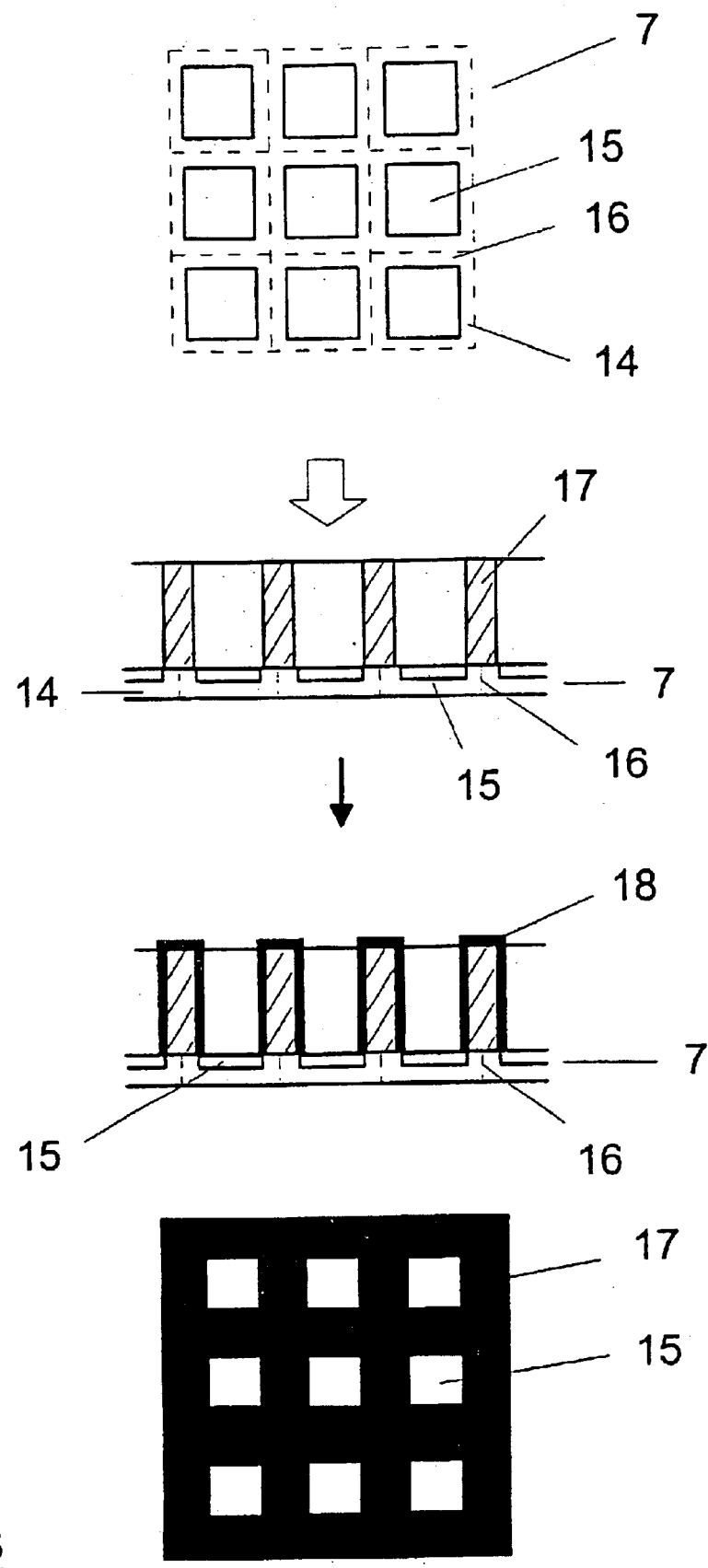
FIG. 3 depicts a first example for the implementation of the inventive method.

FIG. 3 shows a first example for the implementation of the present method. The Figure shows an excerpt from the detector 7 with the detector elements 14 adjoining one another. The detector elements 14 form a detector surface having regions 15 sensitive to X-rays and insensitive intermediate regions 16. A basic structure for the absorbent structure elements of the stray radiation grid is now built up on this detector surface over the interspaces 16, using the technique of stereolithography according to FIG. 2. This basic structure 17 is composed of the UV-hardened polymer material. This structure 17 is subsequently coated with a lead material 18. The stray radiation grid has been completed after this coating. Of course, care must be exercised so that the coating 18 is undertaken only on the basic structure 17, so that the sensitive detection regions 15 remain free.

Figure 4:
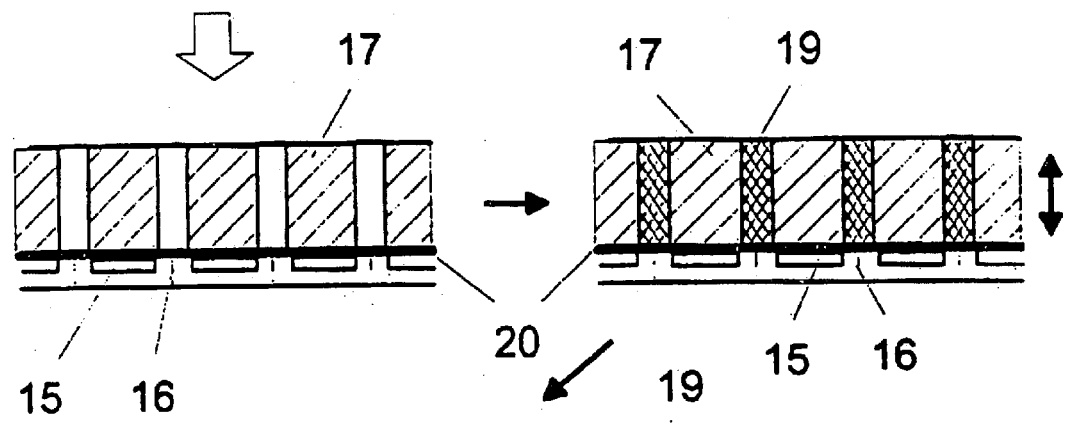
FIG. 4 depicts a second example for the implementation of the present method.
Figure 4:
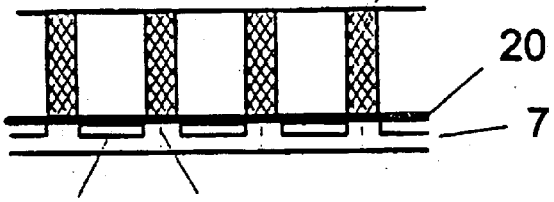

FIG. 4 shows a further embodiment of the present invention wherein the basic structure 17 is applied as negative of the stray radiation grid over the sensitive regions 15 of the detector, with the intermediate regions 16 remaining free. Subsequently, an X-ray-absorbent casting material 19 that subsequently solidifies is filled into these free interspaces. In the present example, a lead-tin-indium alloy material with a low melting point is employed. In this as in the preceding or following example, an intermediate layer 20 can be applied onto the surface of the detector before the application of the basic structure 17. This intermediate layer 20 has a protective function with respect to the surface of the detector.

The basic structure 17 can be entirely or partly removed after the filling and hardening of the absorbent material 19, however, it may remain in the interspaces since it reduces to transmissivity of the primary radiation to only an insignificant extent.

Figure 5:
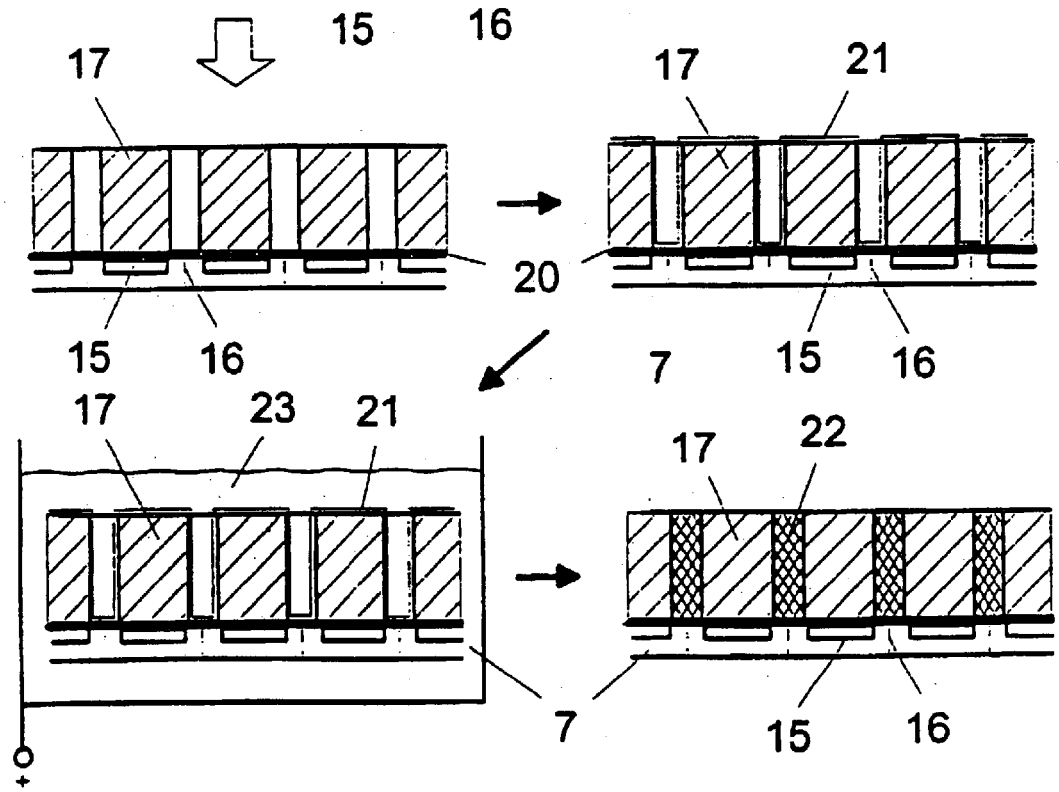
FIG. 5 depicts a third example for the implementation of the inventive method.

In the example of FIG. 5, as in that of FIG. 4, the basic structure is applied onto the surface of the detector as negative of the stray radiation grid. Subsequently, an electroplating start layer 21 is applied onto the surface. By connecting the electroplating start layer 21 to a current source and immersion into a fluid electrolyte 23, the entire interspace is finally filled by galvanic deposition of a highly absorbent material 22, for example lead.

Figure 6:
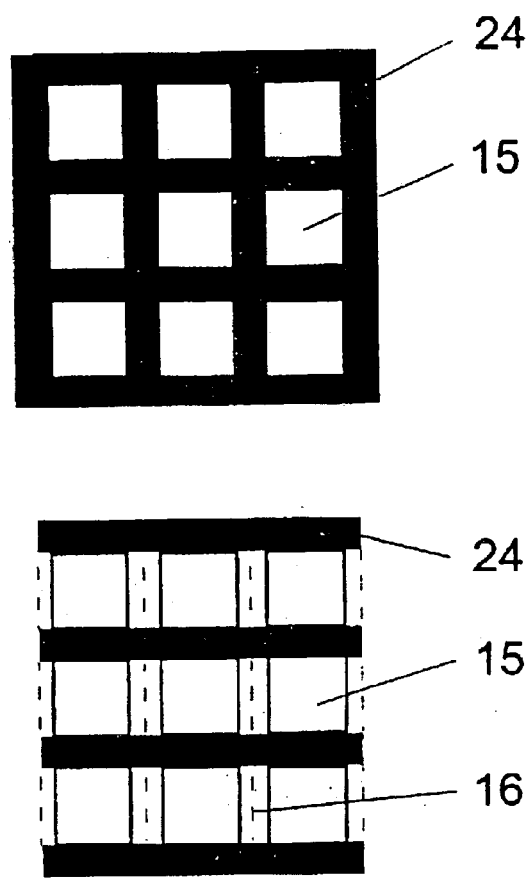
FIG. 6 shows an example of the geometrical arrangement of the absorbent structures of the stray radiation grid in a plan view.

FIG. 6 shows a plan view of an example of the geometrical configuration of the absorbent structure elements generated on the surface of an X-ray detector with the present method. The radiation-sensitive regions 15 are shown with the thin-wall, absorbent structure elements 24 being arranged in a grid between them. The width of these structure elements 24 can be less than the interspaces 16 between the radiation-sensitive regions. Dependent on the dimension of these interspaces 16, however, the absorbent structure elements 24 also can cover a slight edge region of the detection regions.

As an alternative to this cell-like structure of the stray radiation grid, of course, a slot-shaped structure can be realized, as schematically shown in the lower part of FIG. 6. Some other course of the absorbent structure elements along the intermediate regions 16 also is possible.

Figure 7:
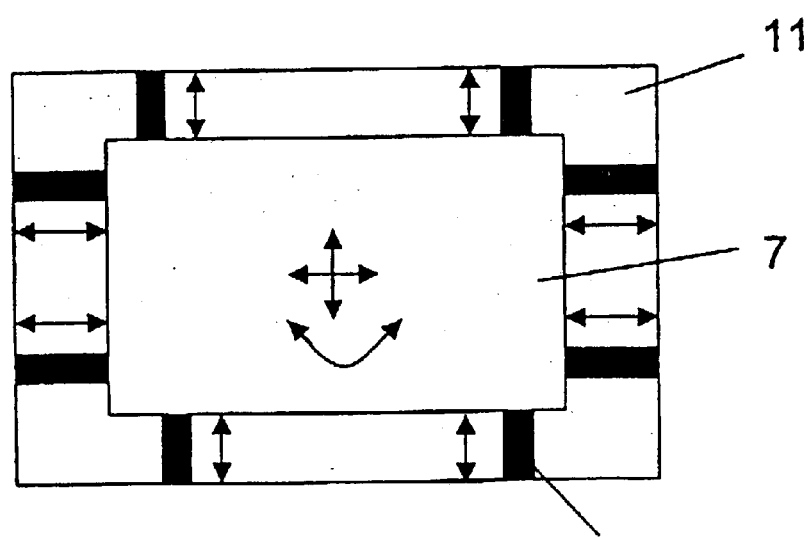
FIG. 7 shows an example of an arrangement for moving the X-ray detector during the application of the basic structure.

When building up the basic structure on the detector surface, it must be assured that the structure is superimposed on the pixel structures with micrometer precision. In order to be able to adhere to this exact positioning, the exact lay of the current pixel structures must be placed into relationship with the current position of the laser beam that generates the structures. For example, markers referred to as "fiducial markers" are suitable for this purpose, this transferring the precise lay of the pixels onto the base surface of the stereolithography structure. Microscopes, for example infrared microscopes, that exactly acquire the lay of the pixels or detector elements can also be utilized. Further, it must be assured that the laser beam can be conducted across the detector surface with adequate precision. This can be achieved, for example, by displacing the X-ray detector on the construction platform relative to the laser beam by means of piezo actuators. FIG. 7 shows an example of this, wherein the X-ray detector is displaced in both directions via eight piezo actuators 25 while the stereolithography structures are being produced. Displacements up to a few 100 $\mu$m are possible at high speed and with great precision using such piezo actuators. A slight turning of the X-ray detector also can be achieved.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for applying a stray radiation grid to an X-ray detector having a plurality of detector elements arranged in a matrix and having a detector surface with detection regions that are sensitive to X-rays and intermediate regions that are less sensitive to X-rays than said detection regions, comprising the steps of:

building up a basic structure for a stray radiation grid over said detector surface directly on said X-ray detector using a rapid prototyping technique; and subsequently applying material to said basic structure that is highly absorbent for X-rays to produce an X-ray absorbent structure lying over said intermediate regions.

2. A method as claimed in claim 1 wherein the step of subsequently applying said material to said basic structure comprises coating said basic structure with said material.

3. A method as claimed in claim 1 wherein the step of subsequently applying said material to said basic structure comprises filling said basic structure with said material.

4. A method as claimed in claim 1 comprising employing a lithography technique selected from the group consisting of stereolithography and micro-stereolithography, as said rapid prototyping technique.

5. A method as claimed in claim 1 comprising providing said basic structure with a geometry dependent on said matrix of said detector elements to form a cellular stray radiation grid having regions transmissive for X-rays coinciding with said detection regions.

6. A method as claimed in claim 1 wherein the step of subsequently applying said material to said basic structure comprises filling said basic structure by casting said basic structure with a fluidized material having a low melting point.

7. A method as claimed in claim 1 wherein the step of subsequently applying said material to said basic structure comprises filling said basic structure by galvanic deposition.

8. A method as claimed in claim 1 wherein the step of subsequently applying said material to said basic structure comprises filling said basic structure with said material, and subsequently at least partially removing said basic structure after said filling.

9. A method as claimed in claim 1 wherein the step of subsequently applying said material to said basic structure comprises coating said basic structure with said material by sputtering.

10. A method as claimed in claim 1 wherein the step of subsequently applying said material to said basic structure comprises coating said basic structure with said material by galvanic deposition.

11. A method as claimed in claim 1 comprising the additional step of applying an intermediate leveling layer on said X-ray detector before building up said basic structure.

12. A method as claimed in claim 1 comprising the additional step of applying an intermediate protective layer on said X-ray detector before building up said basic structure.

13. A method as claimed in claim 1 comprising the additional step of applying an intermediate adhesion-promoting layer on said X-ray detector before building up said basic structure.

14. A method as claimed in claim 1 wherein the step of building up said basic structure comprises building up said basic structure to form a focused stray radiation grid.

* * * * *